United States Patent
Osborn

(10) Patent No.: US 10,064,028 B1
(45) Date of Patent: *Aug. 28, 2018

(54) SYSTEM, METHOD, AND COMPUTER-READABLE MEDIUM FOR INDIRECT ROUTING OF MOBILE-ORIGINATED SMS MESSAGES FOR A MOBILE STATION ATTACHED WITH AN IP-FEMTOCELL SYSTEM

(71) Applicant: RED HAT, INC., Raleigh, NC (US)

(72) Inventor: Christopher Martin Edward Osborn, Allen, TX (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/603,057

(22) Filed: May 23, 2017

Related U.S. Application Data

(63) Continuation of application No. 12/605,526, filed on Oct. 26, 2009, now Pat. No. 9,661,481, which is a
(Continued)

(51) Int. Cl.
*H04W 4/14* (2009.01)
*H04W 12/06* (2009.01)
(Continued)

(52) U.S. Cl.
CPC ............ *H04W 4/14* (2013.01); *H04L 63/083* (2013.01); *H04W 12/06* (2013.01); *H04L 63/164* (2013.01); *H04W 76/02* (2013.01); *H04W 76/10* (2018.02); *H04W 84/045* (2013.01); *H04W 88/085* (2013.01)

(58) Field of Classification Search
None
See application file for complete search history.

(56) References Cited

U.S. PATENT DOCUMENTS

| | | | | |
|---|---|---|---|---|
| 7,990,912 B2 * | 8/2011 | Nix, Jr. | ............... | H04L 41/0856 370/328 |
| 8,150,397 B2 * | 4/2012 | Khetawat | .............. | H04W 88/12 370/328 |

(Continued)

*Primary Examiner* — Gregory B Sefcheck
(74) *Attorney, Agent, or Firm* — Haynes and Boone, LLP

(57) ABSTRACT

A system, method, and computer readable medium that facilitate indirect routing of mobile-originated short messages for a mobile station attached with a femtocell system are provided. A convergence server uses indirect routing for delivery of a short message. The MS may elect to use a traffic or paging channel for delivery of the short message. If the MS selects the traffic channel for delivery of the message and if there is no existing traffic channel, the MS may first attempt to establish a traffic channel. If an active traffic channel is already established between the mobile station and the femtocell system, the mobile station sends the message to the femtocell system which, in turn, forwards the message to the convergence server. If the MS elects to send the message over a paging channel, the MS sends the message along with authentication data to the femtocell system that first performs authentication and subsequently forwards the message to the convergence server which, in turn, forwards the short message to the home message center.

20 Claims, 9 Drawing Sheets

Related U.S. Application Data continuation-in-part of application No. 12/252,231, filed on Oct. 15, 2008, now Pat. No. 8,194,590, and a continuation-in-part of application No. 12/252,238, filed on Oct. 15, 2008, now Pat. No. 8,792,920, and a continuation-in-part of application No. 12/252,246, filed on Oct. 15, 2008, now Pat. No. 8,351,901.

(60) Provisional application No. 61/003,151, filed on Nov. 15, 2007.

(51) Int. Cl.
*H04L 29/06* (2006.01)
*H04W 76/02* (2009.01)
*H04W 84/04* (2009.01)
*H04W 88/08* (2009.01)
*H04W 76/10* (2018.01)

(56) References Cited

U.S. PATENT DOCUMENTS

| | | | | |
|---|---|---|---|---|
| 8,189,549 B2 * | 5/2012 | Caldwell | ............. | H04L 12/14 370/328 |
| 8,204,502 B2 * | 6/2012 | Khetawat | ............. | H04W 8/04 370/230 |
| 8,380,217 B2 * | 2/2013 | Caldwell | ............. | H04W 48/06 370/252 |
| 8,499,082 B2 * | 7/2013 | Roach | ............. | H04M 7/123 370/259 |
| 8,699,462 B2 * | 4/2014 | Spinelli | ............. | H04W 92/02 370/331 |
| 8,953,567 B2 * | 2/2015 | Annamalai | ............. | H04W 8/04 370/338 |

* cited by examiner

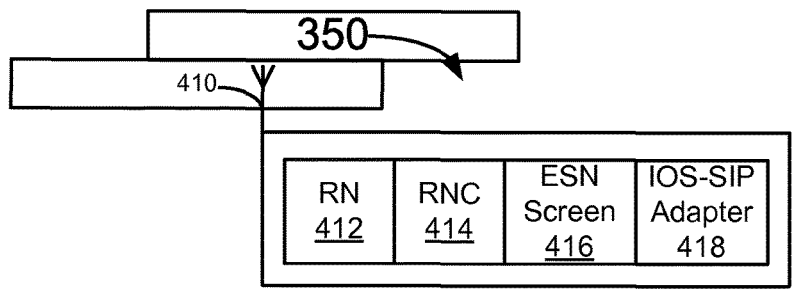
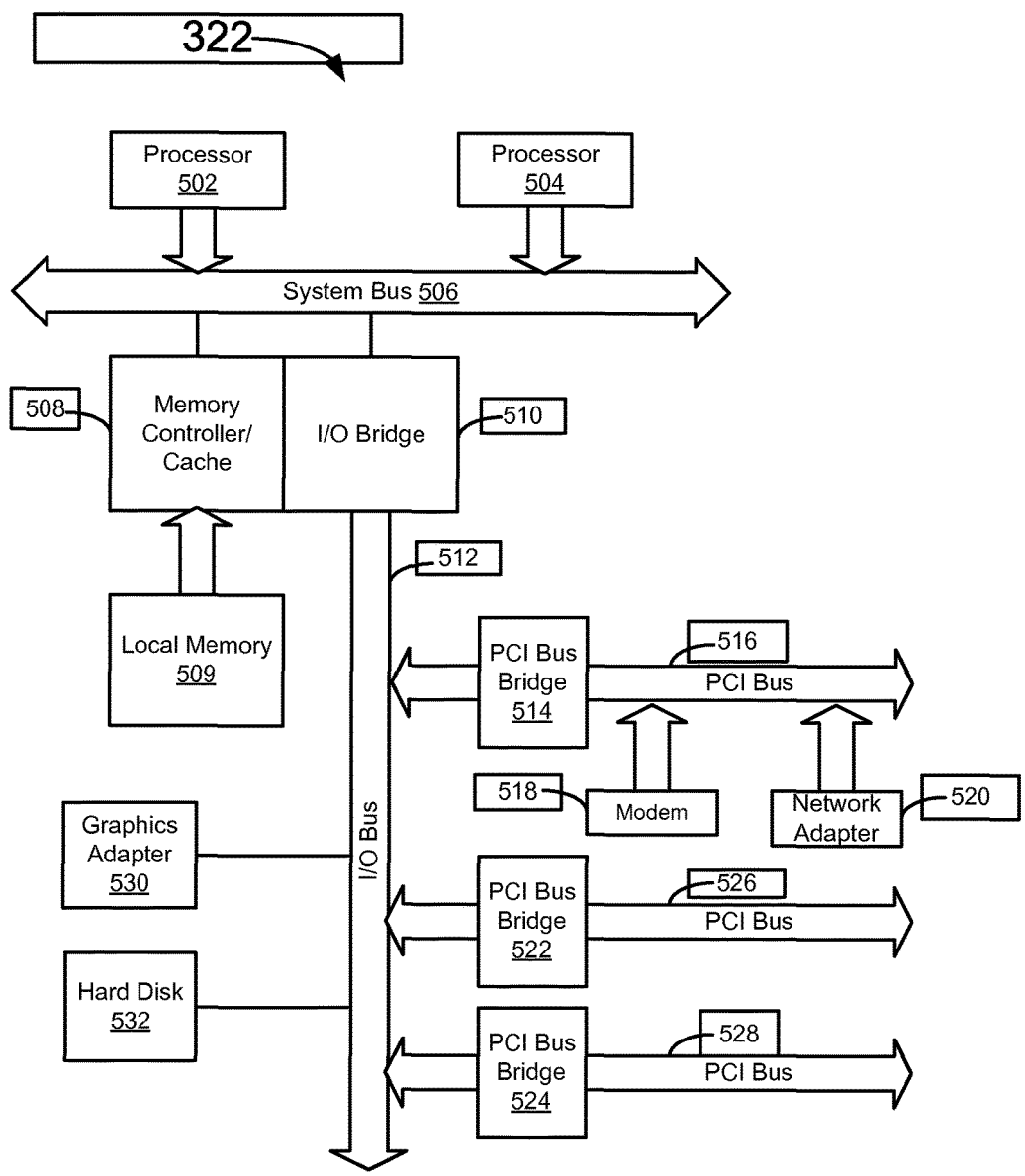
Figure 4
Figure 5

```
                                  900 ─┐
                                       ↘        ┌─ 920
    ┌─ ─ ─ ─ ─ ─ ─ ─ ─ ─ ─ ─ ─ ─ ─ ─ ─ ─ ─ ─ ─ ─ ─ ─ ─ ─ ─ ─ ┐
    | <?xml version="1.0" encoding="UTF-8"?>
    | <bsap-message type="3GPP2">          ┌─ 902          ┌─ 904
    |      <cm-service-request msgid="32-bit-integer" rand="93A546BD"
    |                                ┌─ 906          ┌─ 908
    |                       authr="03354C" count="2E">
    |                 ┌─ 910
    |           <digits>19870206806c</digits>
    |      </cm-service-request>
    | </bsap-message>
    └─ ─ ─ ─ ─ ─ ─ ─ ─ ─ ─ ─ ─ ─ ─ ─ ─ ─ ─ ─ ─ ─ ─ ─ ─ ─ ─ ─ ┘
                                                    ┌─ 922
    ┌─ ─ ─ ─ ─ ─ ─ ─ ─ ─ ─ ─ ─ ─ ─ ─ ─ ─ ─ ─ ─ ─ ─ ─ ─ ─ ─ ─ ┐
    | <?xml version="1.0" encoding="UTF-8"?>
    | <bsap-message type="3GPP2">          ┌─ 902          ┌─ 904
    |      <cm-service-request msgid="32-bit-integer" rand="93A546BD"
    |                                ┌─ 906          ┌─ 908
    |                       authr="03354C" count="2E" >
    |                 ┌─ 912
    |           <auth-data>F391C5</auth-data>
    |      </cm-service-request>
    | </bsap-message>
    └─ ─ ─ ─ ─ ─ ─ ─ ─ ─ ─ ─ ─ ─ ─ ─ ─ ─ ─ ─ ─ ─ ─ ─ ─ ─ ─ ─ ┘
```

Figure 9A

```
              940 ─┐
                   ↘
<?xml version="1.0" encoding="UTF-8"?>
<bsap-message type="3GPP2">                    ┌─ 942                          ┌─ 944
       <global-challenge-response msgid="32-bit integer" successful-auth="true.false"
         ┌─ 946              ┌─ 948            ┌─ 950              ┌─ 952
authtoken="32-bit-integer" cdmaplcm="6 octets" smekey="8 octets" vpmask="66 octets" />
</bsap-message>
```

Figure 9B

SYSTEM, METHOD, AND COMPUTER-READABLE MEDIUM FOR INDIRECT ROUTING OF MOBILE-ORIGINATED SMS MESSAGES FOR A MOBILE STATION ATTACHED WITH AN IP-FEMTOCELL SYSTEM

CROSS REFERENCE TO RELATED APPLICATIONS

The present application is a continuation of U.S. Ser. No. 12/605,526, filed on Oct. 26, 2009, entitled "SYSTEM, METHOD, AND COMPUTER-READABLE MEDIUM FOR INDIRECT ROUTING OF MOBILE-ORIGINATED SMS MESSAGES FOR A MOBILE STATION ATTACHED WITH AN IP-FEMTOCELL SYSTEM", now issued U.S. Pat. No. 9,661,481, issued on May 23, 2017, which is a continuation-in-part of U.S. Ser. No. 12/252,231 filed Oct. 15, 2008, entitled, "SYSTEM, METHOD, AND COMPUTER-READABLE MEDIUM FOR PROCESSING CALL ORIGINATIONS BY A FEMTOCELL SYSTEM", now issued U.S. Pat. No. 8,194,590, issued on Jun. 05, 2012, which is a continuation-in-part of U.S. Ser. No. 12/252,238 filed Oct. 15, 2008, entitled, "SYSTEM, METHOD, AND COMPUTER-READABLE MEDIUM FOR SHORT MESSAGE SERVICE PROCESSING BY A FEMTOCELL SYSTEM", now issued U.S. Pat. No. 8,792,920, issued on Jul. 29, 2014, which is a continuation-in-part of U.S. Ser. No. 12/252,246 filed on Oct. 15, 2008, entitled, "SYSTEM, METHOD, AND COMPUTER-READABLE MEDIUM FOR USER EQUIPMENT REGISTRATION AND AUTHENTICATION PROCESSING BY A FEMTOCELL SYSTEM", now issued U.S. Pat. No. 8,351,901, issued on Jan. 08, 2013, the disclosures of each of which are incorporated herein by reference and each of which claim priority to U.S. provisional patent application Ser. No. 61/003,151, entitled, "SIP-IOS adapter function", filed Nov. 15, 2007, the disclosure of which is incorporated herein by reference. Incorporated by reference is commonly assigned: U.S. Ser. No. 12/252,237 filed Oct. 15, 2008, entitled, "SYSTEM, METHOD, AND COMPUTER-READABLE MEDIUM FOR CALL TERMINATION PROCESSING BY A FEMTOCELL SYSTEM" and U.S. Ser. No. 12/252,242 filed Oct. 15, 2008, entitled, "SYSTEM, METHOD, AND COMPUTER-READABLE MEDIUM FOR SHORT MESSAGE SERVICE TERMINATION PROCESSING BY A FEMTOCELL SYSTEM" and U.S. Ser. No. 12/252,199 filed Oct. 15, 2008, entitled, "SYSTEM, METHOD, AND COMPUTER-READABLE MEDIUM FOR IP-FEMTOCELL PROVISIONED RADIO ACCESS NETWORK" and U.S. Ser. No. 12/252,202 filed Oct. 15, 2008, entitled, "SYSTEM, METHOD, AND COMPUTER-READABLE MEDIUM FOR USER EQUIPMENT HANDOFF WITHIN AN IP-FEMTOCELL NETWORK" and U.S. Ser. No. 12/252,204 filed Oct. 15, 2008, entitled, "SYSTEM, METHOD, AND COMPUTER-READABLE MEDIUM FOR USER EQUIPMENT ACQUISITION OF AN IP-FEMTOCELL SYSTEM" and U.S. Ser. No. 12/252,210 filed Oct. 15, 2008, entitled, "SYSTEM, METHOD, AND COMPUTER-READABLE MEDIUM FOR USER EQUIPMENT HANDOFF FROM A MACROCELLULAR NETWORK TO AN IP-FEMTOCELL NETWORK" and U.S. Ser. No. 12/252,212 filed Oct. 15, 2008, entitled, "SYSTEM, METHOD, AND COMPUTER-READABLE MEDIUM FOR CONFIGURATION OF AN IP-FEMTOCELL SYSTEM" and U.S. Ser. No. 12/252,217 filed Oct. 15, 2008, entitled, "SYSTEM, METHOD, AND COMPUTER-READABLE MEDIUM FOR MOBILE-TO-MOBILE CALLS WITHIN FEMTOCELL NETWORK" and U.S. Ser. No. 12/252,222 filed Oct. 15, 2008, entitled, "SYSTEM, METHOD, AND COMPUTER-READABLE MEDIUM FOR ACCESS RESTRICTION OF USER EQUIPMENT DEVICES IN AN IP-FEMTOCELL SYSTEM" and U.S. Ser. No. 12/252,226 filed Oct. 15, 2008, entitled, "SYSTEM, METHOD, AND COMPUTER-READABLE MEDIUM FOR ABBREVIATED-CODE DIALING IN A NETWORK SYSTEM" and U.S. Ser. No. 12/252,227 filed Oct. 15, 2008, entitled, "SYSTEM, METHOD, AND COMPUTER-READABLE MEDIUM FOR MULTI-STAGE TRANSMIT PROTECTION IN A FEMTOCELL SYSTEM" and U.S. Ser. No. 12/252,234 filed Oct. 15, 2008, entitled, "SYSTEM, METHOD, AND COMPUTER-READABLE MEDIUM FOR MOBILE TERMINATED CALL PROCESSING BY A FEMTOCELL SYSTEM" and PCT Ser. No. PCT/US08/80031 filed Oct. 15, 2008, entitled, "SYSTEM, METHOD, AND COMPUTER-READABLE MEDIUM FOR PROCESSING CALL ORIGINATIONS BY A FEMTOCELL SYSTEM" and PCT Ser. No. PCT/US08/80032 filed Oct. 15, 2008, entitled, "SYSTEM, METHOD, AND COMPUTER-READABLE MEDIUM FOR SHORT MESSAGE SERVICE PROCESSING BY A FEMTOCELL SYSTEM" and PCT Ser. No. PCT/US08/80033 filed Oct. 15, 2008, entitled, "SYSTEM, METHOD, AND COMPUTER-READABLE MEDIUM FOR USER EQUIPMENT REGISTRATION AND AUTHENTICATION PROCESSING BY A FEMTOCELL SYSTEM".

FIELD OF THE INVENTION

The present invention is generally related to radio access technologies and, more particularly, to mechanisms for facilitating mobile station registration and authentication via a femtocell system.

BACKGROUND OF THE INVENTION

Contemporary cellular radio systems, or mobile telecommunication systems, provide an over-the-air interface to wireless mobile stations (MSs), also referred to as user equipments (UEs), via a radio access network (RAN) that interfaces with at least one core network. The RAN may be implemented as, for example, a CDMA2000 RAN, a Universal Mobile Telecommunications System (UMTS) RAN, a Global System for Mobile communications (GSM) RAN, or another suitable radio access network implementation. The MSs may comprise, for example, a mobile terminal such as a mobile telephone, a laptop computer featuring mobile telephony software and hardware, a personal digital assistant (PDA), or other suitable equipment adapted to transfer and receive voice or data communications with the radio access network.

A RAN covers a geographical area comprised of any number of cells each comprising a relatively small geographic area of radio coverage. Each cell is provisioned by a cell site that includes a radio tower, e.g., a base transceiver station (BTS), and associated equipment. BTSs communicate with MSs over an air interface within radio range of the BTSs.

Numerous BTSs in the RAN may be communicatively coupled to a base station controller (BSC), also commonly referred to as a radio network controller (RNC). The BSC manages and monitors various system activities of the BTSs serviced thereby. BSCs are typically coupled with at least one core network.

BTSs are typically deployed by a carrier network in areas having a high population density. The traffic capacity of a cell site is limited by the site's capacity and affects the spacing of cell sites. In suburban areas, sites are often up to two miles apart, while cell sites deployed in dense urban areas may be as close as one-quarter of a mile apart. Because the traffic capacity of a cell site is finitely limited, as is the available frequency spectrum, mobile operators have a vested interest in technologies that allow for increased subscriber capacity.

A microcell site comprises a cell in a mobile phone network that covers a limited geographic area, such as a shopping center, hotel, airport, or other infrastructure that may have a high density mobile phone usage. A microcell typically uses power control to limit the radius of the microcell coverage. Typically a microcell is less than a mile wide.

Although microcells are effective for adding network capacity in areas with high mobile telephone usage, microcells extensively rely on the RAN, e.g., a controlling BSC and other carrier functions. Because contemporary BSCs have limited processing and interface capacity, the number of BTSs - whether microcell BTSs or typical carrier BTSs - able to be supported by the BSC or other RAN functions is disadvantageously limited.

Contemporary interest exists in providing enterprise and office access, including small office/home office (SOHO) radio access, by an even smaller scale BTS. The radio coverage area of such a system is typically referred to as a femtocell. In a system featuring a femtocell, an MS may be authorized to operate in the femtocell when proximate the femtocell system, e.g., while the MS is located in the SOHO. When the MS moves beyond the coverage area of the femtocell, the MS may then be serviced by the carrier network. The advantages of deployment of femtocells are numerous. For instance, mobile users frequently spend large amounts of time located at, for example, home, and many such users rely extensively on cellular network service for telecommunication services during these times. For example, a recent survey indicated that nearly thirteen percent of U.S. cell phone customers do not have a landline telephone and rely solely on cell phones for receiving telephone service. From a carrier perspective, it would be advantageous to have telephone services provisioned over a femtocell system, e.g., deployed in the user's home, to thereby reduce the load and effectively increase the capacity on the carrier RAN infrastructure. However, no mechanisms have been provided for efficiently providing a convergence of femtocell and macrocellular systems in a manner that facilitates delivery of mobile-originated short message service (SMS) messages of a mobile station attached with a femtocell system.

Therefore, what is needed is a mechanism that overcomes the described problems and limitations.

SUMMARY OF THE INVENTION

In accordance with disclosed embodiments, mechanisms that facilitate indirect routing of mobile-originated short message service (SMS) messages for a mobile station attached with a femtocell system are provided. A convergence server (CS) operating as the Visitor Location Register/Mobile Switching Center uses indirect routing, e.g., by forwarding a mobile-originated short message to the home message center (MC) of the mobile station. Thereafter, the short message is sent to the destination MC. Depending on the existence of an assigned traffic channel for the MS and/or the size of the SMS message being sent, the MS may elect to use a traffic or paging channel for delivery of the short message. If the MS selects the traffic channel for delivery of the SMS message and if there is no existing traffic channel, the MS may first attempt to establish a traffic channel. If an active traffic channel is already established between the MS and the femtocell system, the MS sends the SMS message to the femtocell system which, in turn, forwards the SMS message to the CS. If the MS elects to send the SMS message over a paging channel, the MS sends the SMS message along with 1x authentication data to the femtocell system. The femtocell system first performs the authentication, and subsequently forwards the SMS message to the CS which, in turn, forwards the short message to the home message center of the MS that originated the SMS message.

In accordance with an embodiment, a method of facilitating indirect routing of mobile-originated short messages for a mobile station attached with a femtocell system is provided. The method includes receiving, by a convergence server deployed in a core network, a service request message for a mobile station attached with a femtocell system, engaging, by the convergence server, a mobile core network in an authentication process for the mobile station, responsive to the authentication process, transmitting, by the convergence server, a global challenge response to the femtocell system, receiving, by the convergence server, a short message originated by the mobile station from the femtocell system, and transmitting, by the convergence server, the short message to a home message center of the mobile station.

In accordance with another embodiment, a computer-readable medium having computer-executable instructions tangibly embodied thereon for execution by a processing system, the computer-executable instructions for facilitating indirect routing of mobile-originated short messages for a mobile station attached with a femtocell system, is provided. The computer-readable medium includes instructions that, when executed, cause the processing system to receive, by a convergence server deployed in a core network, a service request message for a mobile station attached with a femtocell system, engage, by the convergence server, a mobile core network in an authentication process for the mobile station, transmit, by the convergence server, a global challenge response message including an authentication token to the femtocell system, responsive to the authentication process, transmit, by the convergence server, a global challenge response to the femtocell system, receive, by the convergence server, a short message originated by the mobile station from the femtocell system, and transmit, by the convergence server, the short message to a home message center of the mobile station.

In accordance with another embodiment, a network system that facilitates indirect routing of mobile-originated short messages for a mobile station attached with a femtocell system is provided. The system includes a core network that includes a convergence server, a mobile core network that includes an authentication center, a Home Location Register, and a message center, and an Internet Protocol-based femtocell system that provides a radio access point for a mobile station. The convergence server receives a service request message for the mobile station, engages the mobile core network in an authentication process for the mobile station, transmits a global challenge response message including an authentication token to the femtocell system, responsive to the authentication process, transmits a global challenge response to the femtocell system, receives a short message originated by the mobile station from the femtocell system, and transmits the short message to the message center.

BRIEF DESCRIPTION OF THE DRAWINGS

Aspects of the present disclosure are best understood from the following detailed description when read with the accompanying figures, in which:

FIG. 4 is a simplified diagrammatic representation of femtocell system that facilitates provisioning of a femto-RAN in accordance with an embodiment;

FIG. 5 depicts a block diagram of a data processing system that may be implemented as a convergence server in accordance with an embodiment of the present invention;

FIG. 9A is a diagrammatic representation of a service request message transmitted to the convergence server from a femtocell system implemented in accordance with an embodiment; and FIG. 9B is a diagrammatic representation of a global challenge response message transmitted to the femtocell system from the convergence server in accordance with an embodiment.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
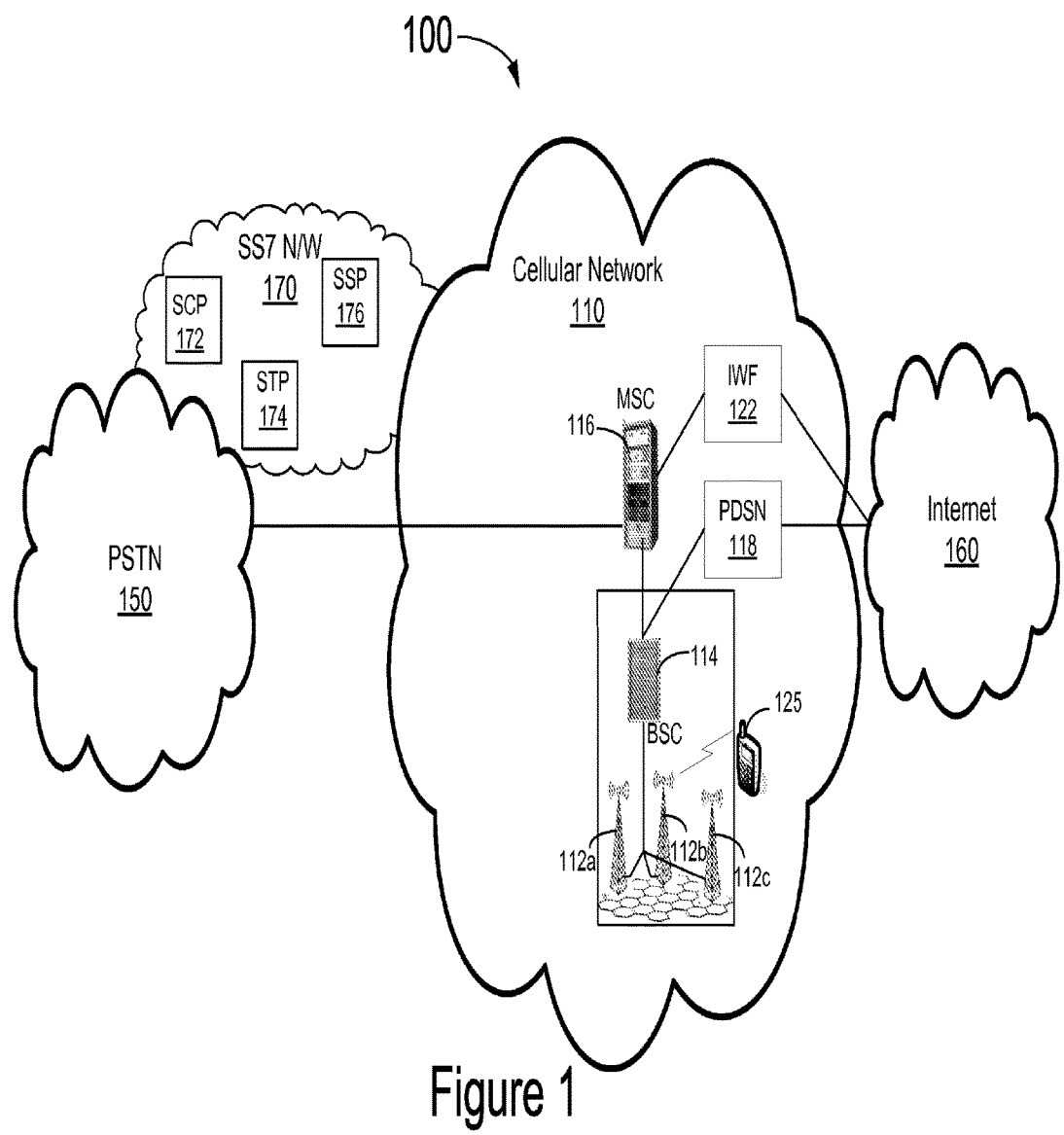
FIG. 1 is a diagrammatic representation of a network system that includes a cellular network adapted to provide macro-cellular coverage to a mobile station.

FIG. 1 is a diagrammatic representation of a network system 100 that includes a cellular network 110 adapted to provide macro-cellular coverage to a mobile station. Cellular network 110 may comprise, for example, a code-division multiple access (CDMA) network, such as a CDMA-2000 network.

Cellular network 110 may include any number of base transceiver stations (BTSs) 112a-112c communicatively coupled with a base station controller (BSC) 114 or RNC. Each individual BTS 112a-112c under the control of a given BSC may define a radio cell operating on a set of radio channels thereby providing service to an MS 125, such as a mobile terminal. BSC 114 manages the allocation of radio channels, receives measurements from mobile terminals, controls handovers, as well as various other functions as is understood. BSC 114 is interconnected with a Mobile Switching Center (MSC) 116 that provides mobile terminal exchange services. BSC 114 may be additionally coupled with a packet data serving node (PDSN) 118 or other gateway service that provides a connection point between the CDMA radio access network and a packet network, such as Internet 160, and provides mobility management functions and packet routing services. MSC 116 may communicatively interface with a circuit switched network, such as the public switched telephone network (PSTN) 150, and may additionally be communicatively coupled with an interworking function (IWF) 122 that provides an interface between cellular network 110 and PSTN 150.

System 100 may also include a signaling system, such as a signaling system #7 (SS7) network 170. SS7 network 170 provides a set of telephony signaling protocols which are used to set up the vast majority of the world's PSTN telephone calls. SS7 network 170 is also used in cellular networks for circuit switched voice and packet-switched data applications. As is understood, SS7 network 170 includes various signaling nodes, such as any number of service control points (SCPs) 172, signal transfer points (STPs) 174, and service switching points (SSPs) 176.

BTSs 112a-112c deployed in cellular network 110 may service numerous network 110 subscribers. Cell cites provided by BTSs 112a-112c commonly feature site ranges of a quarter to a half mile, e.g., in densely populated urban areas, to one to two miles in suburban areas. In other remotely populated regions with suitable geography, site ranges may span tens of miles and may be effectively limited in size by the limited transmission distance of relatively low-powered MSs. As referred to herein, a cell provided by a BTS deployed in carrier network 110 for access by any authorized network 110 subscriber is referred to as a macrocell.

Figure 2:
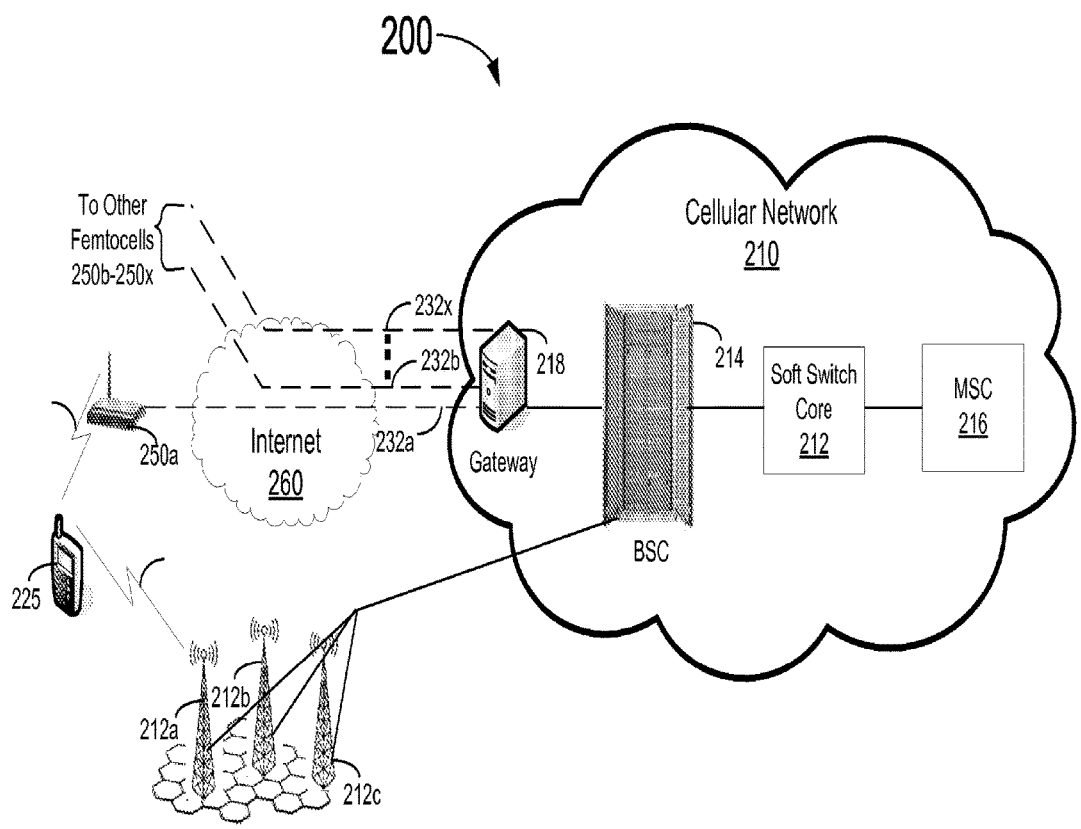
FIG. 2 is a diagrammatic representation of a conventional network system configuration featuring a femtocell system.

FIG. 2 is a diagrammatic representation of a conventional network system 200 configuration featuring a femtocell. In the depicted example, a central BSC 214 deployed in a cellular carrier network 210 may connect with a soft switch core 212 that is connected with a MSC 216. MSC 216 connects with the cellular core network and may interface with other networks, such as the PSTN as is understood. BSC 214 may be connected with and service numerous BTSs 212a-212c that provide macrocells to cellular network 210 subscribers.

BSC 214 may additionally connect with a tunnel gateway system 218 that is adapted to establish secured tunnels 232a-232x with respective femtocell systems 250a-250x. Femtocells comprise cellular access points that connect to a mobile operator's network using, for example, a residential Digital Subscriber Line (DSL) or cable broadband connection. Femtocells 250a-250x provide a radio access point for MS 225 when the MS is within range of a femtocell system with which the MS has authorized access. For example, femtocell system 250a may be deployed in a residence of the user of MS 225. Accordingly, when the user is within the residence, mobile telecommunications may be provided to MS 225 via an air-interface provided by femtocell system 250a. In this instance, MS 225 is effectively offloaded from the macro BTS, e.g., BTS 212a, and communications to and from the MS are carried out with femtocell system 250*a* over Internet 260. Thus, femtocell systems 250*a*-250*x* may reduce the carrier radio resource demands by offloading MSs from macrocells to femtocells and thereby provide for increased subscriber capacity of cellular network 210.

In contemporary implementations such as that depicted in FIG. 2, a femtocell system 250*a* comprises a transceiver without intelligence and is thus required to be connected and managed by BSC 214. Thus, femtocell systems 250*a*-250*x* are reliant on the carrier network centralized BSC 214 which has limited capacity and thus does not exhibit desirable scaling characteristics or capabilities. Moreover, high communications overhead are realized by the BTS backhaul.

Figure 3A:
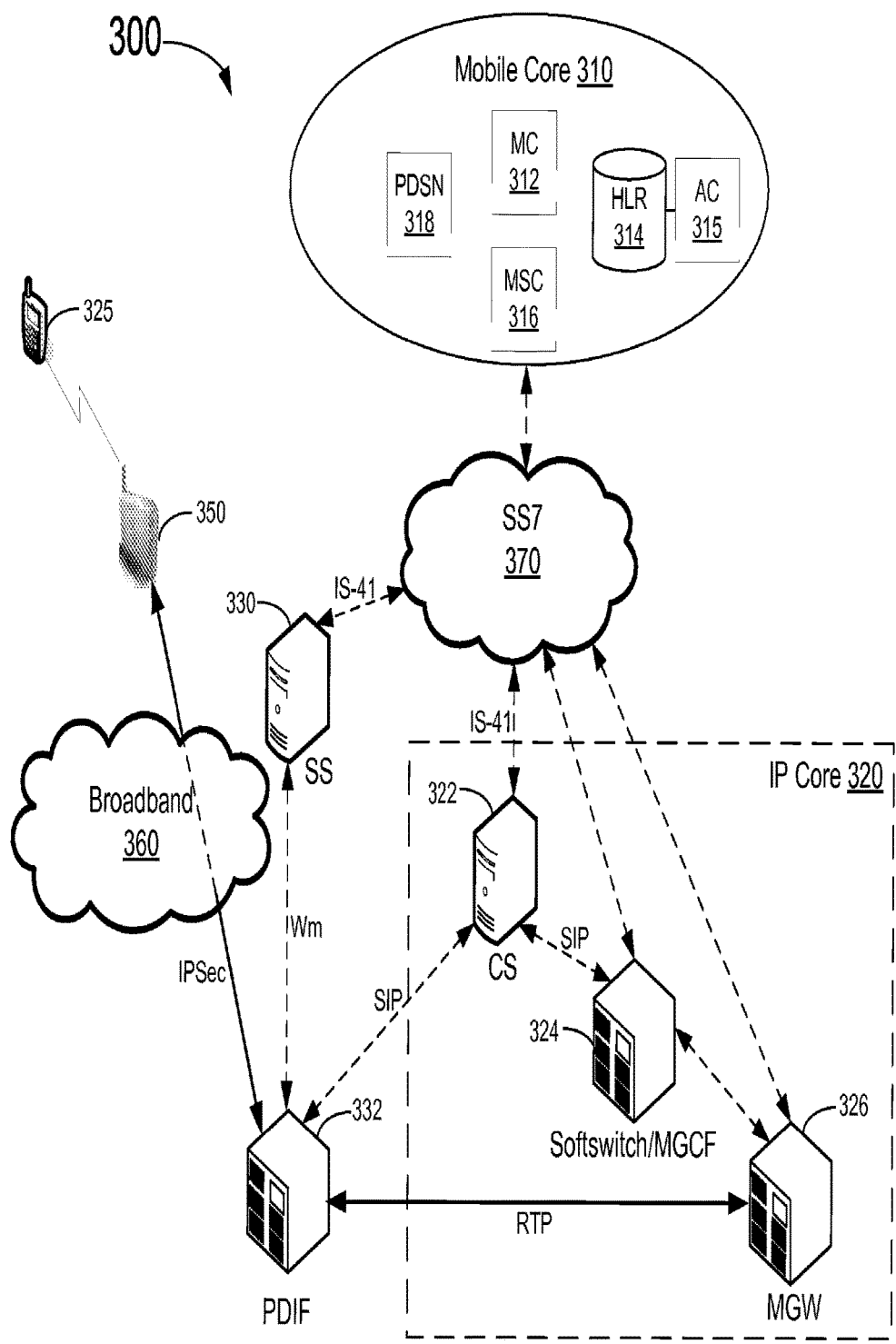
FIG. 3A is a diagrammatic representation of a network system in which a femtocell system implemented in accordance with an embodiment of the invention may be deployed.

FIG. 3A is a diagrammatic representation of a network system 300 in which a femtocell system implemented in accordance with an embodiment of the invention may be deployed. System 300 includes a mobile core network 310 implemented as, for example, a code division multiple access (CDMA) core network that interfaces with a SS7 network 370. Mobile core network 310 may include a Messaging Center (MC) 312, a Home Location Register (HLR) 314, an authentication center (AC) 315, a Mobile Switching Center (MSC) 316, a Packet Data Serving Node (PDSN) 318, and various other components. The HLR 314 is a central database that contains details of each MS subscriber authorized to use the mobile core network 310. There may be several HLRs deployed in the core network 310. The HLR 314 maintains details of each Subscriber Identity Module (SIM) card issued by the mobile network operator, e.g., the International Mobile Subscriber Identity (IMSI) stored in the SIM card, services authorized for the associated user, a location of the MS, and various other information. The HLR 314 may interface with the AC 315 that functions to facilitate authentication of MSs that access the cellular network. The MSC 316 provides mobile terminal exchange services and may communicatively interface with a circuit switched network, such as the public switched telephone network. The MSC 316 handles voice calls and Short Message Service (SMS), sets up and releases end-to-end connections, and handles mobility and hand-over requirements during calls as well as other functions. The PDSN 318 provides an interface between the radio access and IP networks. The PDSN 318 provides, for example, mobility management functions and packet routing functionality.

System 300 includes an Internet Protocol (IP) core network 320 that interfaces with the SS7 network 370, e.g., via IS-41. In accordance with an embodiment, the IP core network 320 includes a convergence server (CS) 322, a softswitch/Media Gateway Controller Function (MGCF) 324, and a Media Gateway (MGW) 326 among other components. The CS 322 may be communicatively coupled with the SS7 network 370 and a Packet Data Interworking Function (PDIF) 332, e.g., via Session Initiation Protocol (SIP) communications. The CS 322 provides SIP registration functions and a central interface point to Voice over Internet Protocol (VoIP) elements and the softswitch/MGCF 324. The CS 322 further provides SIP-MSC and Interworking functions between existing VoIP network elements and the operator's core network. To this end, the CS 322 may interface directly with the MC 312 and the HLR 314 using, for example, a TIA-41 interface.

The softswitch/MGCF 324 may be communicatively coupled with the CS 322, e.g., via SIP communications, with the SS7 network 370, and with the MGW 326. The softswitch/MGCF 324 may connect calls from one device to another and perform call control protocol conversion, for example, between SIP and ISDN User Part (ISUP). The MGW 326 may be communicatively coupled with the SS7 network 370 and the PDIF 332 in addition to the softswitch/MGCF 324. The MGW 326 may convert data between real-time transport protocol (RTP) and pulse code modulation (PCM), and may also be employed for transcoding. Resources of the MGW 326 may be controlled by the softswitch/MGCF 324.

In accordance with an embodiment, the system 300 may include a Security Server (SS) 330 that interfaces with the SS7 network 370, e.g., via IS-41, and the PDIF 332, e.g., via a Wm interface. The PDIF 332 facilitates access to the IP core network 320 via WiFi access points and may be responsible for such services as, for example, security, access, authentication, policy enforcement, user information collection, and IP address allocation as well as other services. The PDIF 332 may interface, e.g., via SIP communications, with the CS 322, and may have Real-time Transport Protocol (RTP) communications with the MGW 326. Further, the PDIF 332 may have secured IP communications, e.g., IPsec, established with one or more femtocell systems, e.g., a femtocell system 350 deployed at a user premise, such as a home office. The secured communications may be established between the PDIF 332 and the femtocell system 350 over, for example, a broadband network 360 interface such as a residential DSL or cable broadband connection. The femtocell system 350, in turn, provides a radio access point for one or more MSs 325 when the MS 325 is within range of the femtocell system 350 with which the MS 325 has authorized access.

In accordance with an embodiment, a femtocell system 350 may include integrated BTS and BSC functions and may feature additional capabilities available in the provided femtocell site coverage area. Femtocell system 350 provides an IP-accessible radio access network, is adapted for operation with IP core network 320, and provides radio link control functions. Femtocell system 350 may be communicatively coupled with broadband network 360 via any variety of backhaul technologies, such as an 802.11x link, a 10/100 BaseT LAN link, a T1/E1 Span or fiber, cable set top box, DSL modem connected with a central office digital subscriber line access multiplexer, a very small aperture terminal (VSAT), or another suitable backhaul infrastructure.

In an embodiment, femtocell system 350 includes a session initiation protocol (SIP) adapter that supports a SIP client pool and provides conversion of call set-up functions to SIP client set-up functions. To this end, the femtocell system 350 may be allocated an IP address. Additionally, femtocell system 350 includes electronic serial number (ESN) screening and/or Mobile Equipment Identifier (MEID) screening to allow only designated MSs to access the femtocell. Configuration of the femtocell system 350 with ESN(s) or MEID(s) may be made as part of an initial femtocell system 350 activation.

In another embodiment, a femtocell system 350 may be implemented as a 3G-complinat entity, e.g., to service UMTS mobile terminals, and may be deployed in a small office/home office (SOHO) or other suitable enterprise. To this end, the femtocell system 350 may include an integrated RNC and radio node (RN). In a particular implementation, the femtocell system 350 may be implemented as an Evolution-Data Optimized (EV-DO) entity, e.g., a 1xEV-DO integrated IP-RAN. The femtocell system 350 provides an IP-accessible radio access network and provides radio link control functions.

Figure 3B:
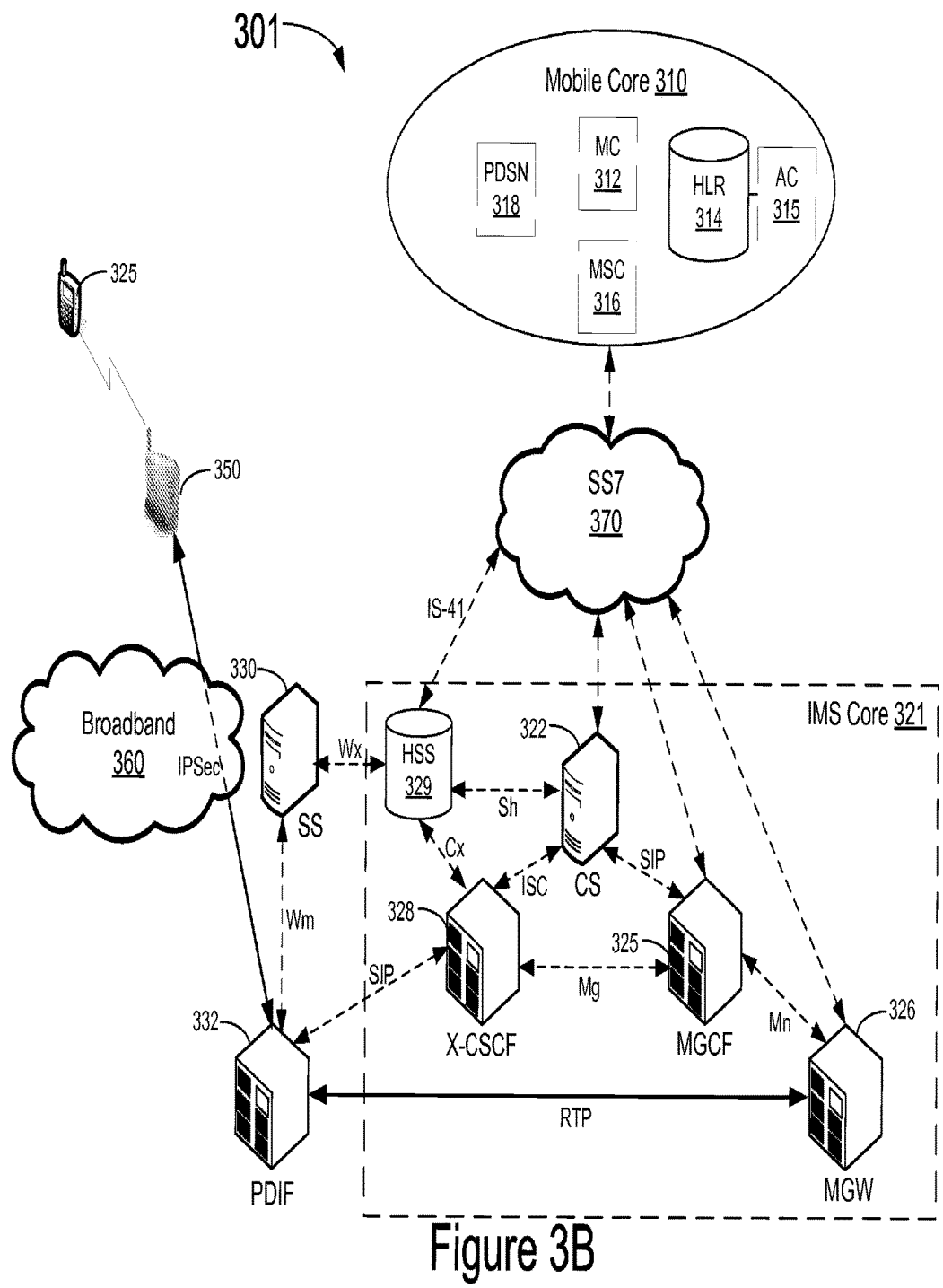
FIG. 3B is a diagrammatic representation of an alternative network system in which a femtocell system implemented in accordance with an embodiment of the invention may be deployed.

FIG. 3B is a diagrammatic representation of an alternative network system 301 in which a femtocell system implemented in accordance with an embodiment of the invention may be deployed. System 301 includes a mobile core network 310 implemented as, for example, a CDMA core network that interfaces with a SS7 network 370. The mobile core network 310 may include an MC 312, an HLR 314, an AC 315, an MSC 316, and a PDSN 318, and various other components as described above with regard to the mobile core network 310 of FIG. 3A.

System 301 includes an IP Multimedia Subsystem (IMS) core network 321 that interfaces with the SS7 network 370. In accordance with an embodiment, the IMS core network 321 includes a CS 322, a MGCF 325, an MGW 326, an X-Call Session Control Function (X-CSCF) 328, and a Home Subscriber Server (HSS) 329 among other components. The X-CSCF 328 processes SIP signaling packets and provides a centralized interface for control and signaling including SIP registration functions in accordance with disclosed embodiments. The X-CSCF 328 may provide Interrogating-CSCF (I-CSCF) services, Proxy-CSCF (P-CSCF) services, and Serving-CSCF (S-CSCF) services. The X-CSCF 328 comprises various SIP servers or proxies that process SIP signaling packets in the IMS core network 321. P-CSCF services provided by X-CSCF may include provisioning a first point of contact for an IMS-compliant MS. In such a situation, the X-CSCF may be located in a visited network or in an MS's home network if the visited network is not fully IMS-compliant. An MS may discover the X-CSCF 328, e.g., by using Dynamic Host Configuration Protocol (DHCP), or by assignment in a packet data protocol context. S-CSCF services provided by the X-CSCF 328 include provisioning as a central node of the signaling plane. To this end, the S-CSCF comprises a SIP server, but additionally performs session control. Further, the X-CSCF 328 is interfaced with the HSS 329 and/or HLR 314 to download and upload user profiles for providing S-CSCF services. The X-CSCF 328 further includes a SIP function for providing I-CSCF services. To this end, the X-CSCF 328 has an IP address that is published in the Domain Name System (DNS) that facilitates location of the X-CSCF 328 by remote servers. Thus, I-CSCF services of the X-CSCF 328 may be used as a forwarding point for receipt of SIP packets within the domain.

The CS 322 may be configured to operate as an IMS application server that interfaces with the X-CSCF 328 using the ISC interface. The HSS 329 comprises a user database that supports IMS network entities that manage or service calls. The HSS 329 contains subscription-related information, e.g., subscriber profiles, may perform authentication and authorization of users, and may provide information about locations of MSs and IP information. In a fully standard IMS architecture, the CS 322 may interface with the HSS 329. However, in other scenarios, the HLR 314 may anchor the service even with the HSS 329 deployed within the system 301. Accordingly, the CS 322 may be communicatively interfaced with the HLR 314 for location updates using, for example, a TIA-41 interface. Further, the CS 322 is preferably interfaced with the MC 312 using, for example, a TIA-41 interface.

The CS 322 may be communicatively coupled with the SS7 network 370, the MGCF 325, e.g., via SIP communications, the X-CSCF 328, e.g., via ISC, and the HSS 329, e.g., via an Sh interface. The MGCF 325 may be communicatively coupled with the MGW 326, e.g., via an Mn interface, the X-CSCF 328, e.g., via an Mg interface, and the SS7 network 370 in addition to the CS 322. The MGW 326 may be communicatively coupled with the SS7 network 370 and a PDIF 332 in addition to the MGCF 325. The MGW 326 may convert data between RTP and PCM, and may also be employed for transcoding. Resources of the MGW 326 may be controlled by the MGCF 325. The X-CSCF 328 may be communicatively coupled with the PDIF 332 for exchanging SIP communications therewith and the HSS 329, e.g., via a Cx interface, in addition to the CS 322 and the MGCF 325. The HSS 329 may be communicatively coupled with the SS7 network 370, e.g., via IS-41, and a SS 330, e.g., via a Wx interface. The SS 330 may be coupled with the PDIF 332, e.g., via a Wm interface.

The PDIF 332 facilitates access to the IMS core network 321 via WiFi access points and may be responsible for such services as, for example, security, access, authentication, policy enforcement, user information collection, and IP address allocation as well as other services. The PDIF 332 may have RTP communications with the MGW 326. Further, the PDIF 332 may have secured IP communications, e.g., IPsec, established with one or more femtocell systems, e.g., a femtocell system 350 deployed at a user premise, such as a home office. The secured communications may be established between the PDIF 332 and the femtocell system 350 over, for example, a broadband network 360 interface such as residential DSL or cable broadband connection. The femtocell system 350, in turn, provides a radio access point for one or more MSs 325 when the MS 325 is within range of the femtocell system 350 with which the MS 325 has authorized access.

FIG. 4 is a simplified diagrammatic representation of femtocell system 350 that facilitates provisioning of a femto-RAN in accordance with an embodiment. Femtocell system 350 includes an antenna 410 coupled with a RN 412. RN 412 may be implemented, for example, as a 1xEV-DO ASIC device for provisioning a 1xEV-DO Rev. 0 air interface or a 1xEV-DO Rev. A air interface. RN 412 may be communicatively coupled with a RNC 414 that provides radio control functions, such as receiving measurements from MSs, control of handovers to and from other femtocell systems, and may additionally facilitate handoff to or from macrocells. RNC 414 may also provide encryption/decryption functions, power, load, and admission control, packet scheduling, and various other services.

Femtocell system 350 includes an electronic serial number screening function 416 that may facilitate approving or rejecting service for an MS by femtocell system 350. Additionally, femtocell system 350 includes an Internet Operating System (IOS) and SIP Adapter (collectively referred to as IOS-SIP Adapter 418). IOS-SIP adapter 418 may invoke and manage SIP clients, such as a user agent (UA) pool comprising one or more UAs. Each MS authorized to be serviced by femtocell system 350 may have a UA allocated therefor by femtocell system 350 in a manner that facilitates transmission of communications to and from an MS over an IP backhaul. Accordingly, when an authorized MS is within the femtocell system 350 site range, telecommunication services may be provided to the MS via the IP backhaul and the femtocell system 350 provisioned RAN. When the MS is moved beyond the service range of femtocell system 350, telecommunication service may then be provided to the MS via macrocellular coverage. Femtocell system 350 may perform a DNS/ENUM registration on behalf of MSs authorized to obtain service from femtocell system 350 and may generate and issue a SIP registration on behalf of an MS authorized for service access by the femtocell system 350.

FIG. 5 depicts a block diagram of a data processing system that may be implemented as a convergence server 322 in accordance with an embodiment of the present invention. CS 322 may be a symmetric multiprocessor (SMP) system including a plurality of processors 502 and 504 connected to a system bus 506. Alternatively, a single processor system may be employed. Also connected to system bus 506 is memory controller/cache 508 which provides an interface to local memory 509. An I/O bus bridge 510 is connected to system bus 506 and provides an interface to an I/O bus 512. Memory controller/cache 508 and I/O bus bridge 510 may be integrated as depicted.

Peripheral component interconnect (PCI) bus bridge 514 connected to I/O bus 512 provides an interface to PCI local bus 516. A number of modems may be connected to a PCI local bus 216. Communication links to clients may be provided through a modem 518 and network adapter 520 connected to PCI local bus 516 through add-in connectors.

Additional PCI bus bridges 522 and 524 provide interfaces for additional PCI local buses 526 and 528, from which additional modems or network adapters may be supported. In this manner, server 322 allows connections to multiple system nodes. A memory-mapped graphics adapter 530 and hard disk 532 may also be connected to I/O bus 512 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

While the CS 322 depicted in FIG. 5 comprises an SMP system, it should be understood that any variety of server configurations and implementations may be substituted therefor. The depicted server 322 is provided only to facilitate an understanding of disclosed embodiments, and the configuration of the CS 322 is immaterial with regard to the disclosed embodiments.

In many CDMA networks, a subscriber is uniquely identified by the combination of an electronic serial number (ESN) and a mobile identification number (MIN). A mobile equipment identifier (MEID) is an extension of the ESN that facilitates an increase in the number of manufacturers' codes. A pseudo-ESN (p-ESN) may be derived from the MEID to be used in place of the ESN. The MIN-ESN, or MIN-p-ESN, combination is used primarily for registration and authentication functions. Contemporary CDMA MSs may support an international mobile station identity (IMSI) and use the IMSI in place of the MIN to offer an improved address space and utilization by international applications. With the introduction of IMSI, the concept of a mobile station identity may be either an MIN or an IMSI. Due to the variations in different parameters for identification, it is assumed herein that a unique identifier is included in the username portion of the To Header of a SIP:REGISTER request to create and identify the mobile station subscriber during the registration procedures described hereinbelow. This unique identifier is referred to herein as the register ID (RegID). An optional network dependent predefined prefix may be stripped from the register ID prior to use in the convergence server functions. The register ID may contain an MIN or an IMSI paired with either an MEID, an ESN, or a p-ESN. However, other options may be suitably implemented without departing from the disclosed embodiments.

In accordance with an embodiment, the CS 322 emulates the functionality of a MSC and Visitor Location Register (VLR) to facilitate authentication and registration of MSs in a carrier's CDMA network. To this end, the CS 322 may interface with the HLR 314 for authentication, location updates, and other services using an IS-41 interface.

In a pre-IMS environment, e.g., as network system 300 depicted in FIG. 3A, the CS 322 receives a SIP: REGISTER message directly from the femtocell system 350, or from the femtocell system 350 acting as a proxy for the MS 325. The CS 322 provides SIP registration functions and is the central interface point to the softswitch/MGCF 324 and VoIP elements.

In an IMS network such as network system 301 depicted in FIG. 3B, the CS 322 functions as an IMS application server, and the IMS infrastructure provides the centralized interface control and signaling including SIP registration functions. In this environment, the femtocell system 350 itself, or alternatively the femtocell system 350 acting as a proxy for the MS 325, sends a SIP:REGISTER (e.g., via other CSCFs) to the S-CSCF which performs a third-party registration of the MS 325 with the CS 322 based on initial filter criteria stored in the HSS 329.

In an embodiment, the femtocell system 350 may be configured to support "Global Challenge" based authentication on all system access (e.g., Registration, Call Origination, Call Termination, and Data Burst messages). The femtocell system may indicate a Global Challenge request by setting an authentication bit (e.g., AUTH=1) in the overhead message train (OMT). The femtocell system 350 may also include a global random challenge value (RAND) used in generating the authentication result by both the MS and the HLR/AC.

The femtocell system preferably establishes an IPsec tunnel over the broadband network with the PDIF 332 or, alternatively, a P-CSCF before sending any SIP traffic to the CS 322. The IPsec tunnel may be established immediately after the femtocell system 350 is powered on or when an MS 325 attempts to establish a connection with the femtocell system 350. In this implementation, the CS 322 is not involved in establishing the IPsec tunnel.

In an embodiment, the CS 322 may be configured to receive CDMA-1x authentication data at the end of a SIP registration message using a SIP:MESSAGE received from the femtocell system 350. In this manner, the CS 322 conveys the result of the 1x authentication and, if needed, performs various authentication procedures, such as a unique challenge, SSD update, and a call history count.

Figure 6:
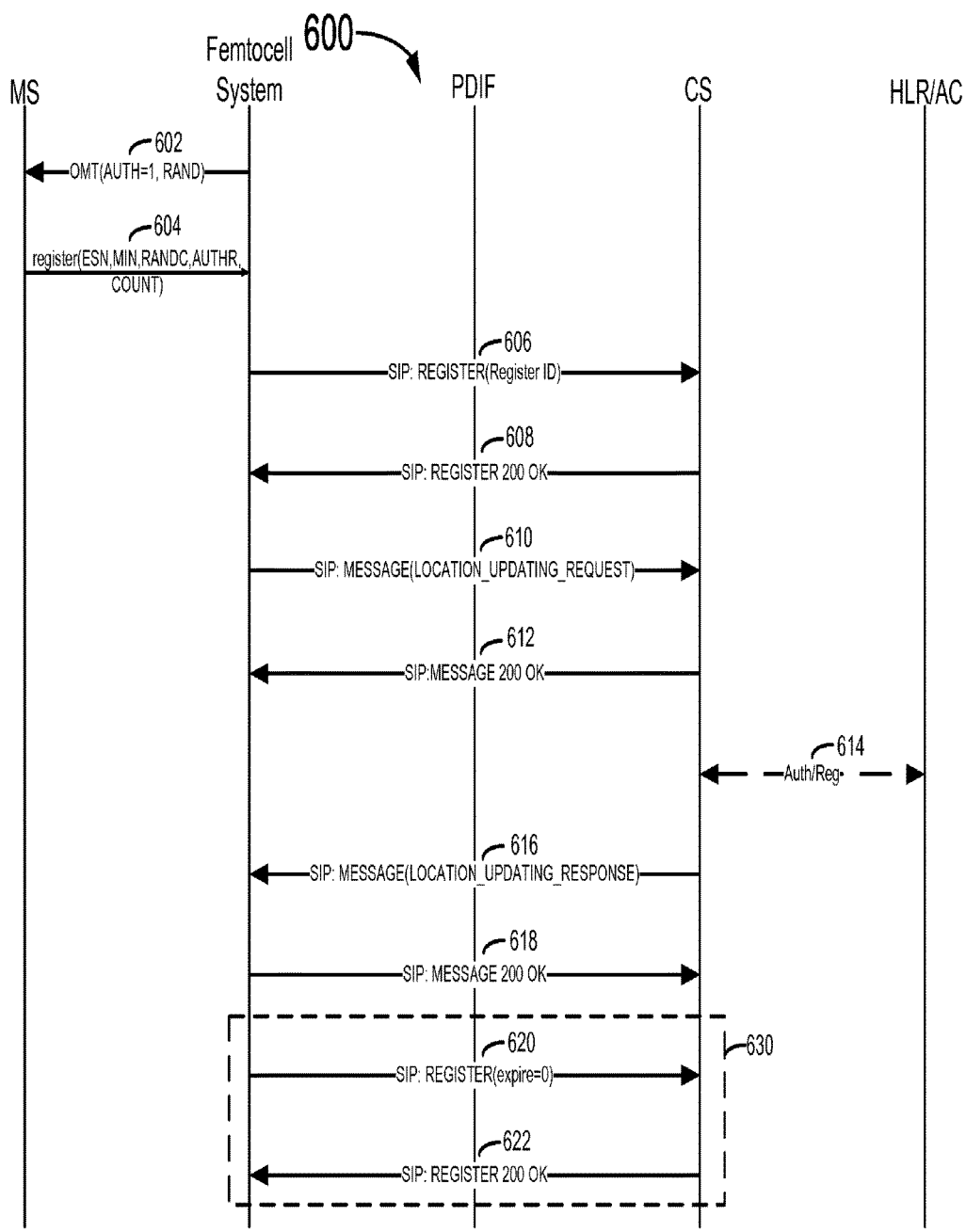
FIG. 6 depicts a diagrammatic representation of a registration and authentication process on initial system access by a mobile station via a femtocell system in a non-Internet Protocol Multimedia Subsystem network implemented in accordance with an embodiment.

FIG. 6 depicts a diagrammatic representation of a registration and authentication process 600 on initial system access by an MS via a femtocell system in a non-IMS network, such as network system 300 depicted in FIG. 3A, implemented in accordance with an embodiment. A SIP registration phase is invoked by transmission of an OMT by the femtocell system 350 (step 602). An OMT facilitates autonomous registration and may, for example, be transmitted on paging/access channels. Transmission of the OMT by the femtocell system 350 may be made at a predefined interval, e.g., once a second. The OMT may include parameters for system and region identification and may be distinguished from OMTs transmitted by other entities, e.g., by macro BTSs. An MS 325 in idle mode may detect the OMT when the MS 325 is within range of the femtocell system 350. In accordance with an embodiment, the OMT transmitted by the femtocell system 350 includes an authentication bit (AUTH) having a value, e.g., "1", that indicates authentication is required for all system access. Further, the OMT includes a random number (RAND) generated by the femtocell system 350.

Based on the values in the OMT, the MS determines that a new serving system has been encountered and that authentication is required based on the authentication bit value (AUTH=1). Subsequently, the MS 325 attempts to obtain the random number (RAND) to be used for the authentication from the OMT. If the random number is not available, a zero value may be used by the MS as prescribed by TR-45 authentication procedures. The MS 325 then generates an authentication result (AUTHR). For example, the MS 325 may generate an authentication result from a shared secret data key (SSD-A) stored by the MS 325, the ESN or p-ESN, the MIN, and the RAND value obtained from the OMT. The authentication result may be generated, for example, by execution of the well known CAVE algorithm by the MS 325. The MS then transmits a registration request to the femtocell system 350 (step 604). The register message may include the MS's MIN, ESN or p-ESN, the authentication result (AUTHR), a CallHistoryCount (COUNT), and a random confirmation (RANDC) derived from the random number (RAND) used to compute the authentication result (AUTHR).

On receiving the registration request from the MS 325, the femtocell system 350 sends a SIP:REGISTER message to the CS 322 (step 606) in accordance with an embodiment that includes the unique register ID associated with the MS, e.g., derived from an MIN or an IMSI paired with either an MEID, an ESN, or a p-ESN.

Optionally, the femtocell system 350 may establish an IPsec tunnel with the PDIF 332. The CS 322 then acknowledges receipt of the SIP:REGISTER message by transmitting a 200 OK SIP response to the femtocell system 350 (step 608).

A registration phase is then invoked by the femtocell system 350 transmitting 1x authentication parameters received from the MS 325 at step 604 to CS 322 in a SIP: MESSAGE(LOCATION UPDATING REQUEST) (step 610). The location updating request message includes the random number (RAND) rather than the random number confirmation (RANDC). The location updating request message additionally may include parameters, such as a Register ID, ESN, MEID, MIN, IMSI, etc. Using the Register ID, the CS 322 may associate the location updating request with the preceding SIP:REGISTER request received thereby from the femtocell system 350 in step 606. If the location updating request message includes a P-Access-Network-Info (PANI) header that may specify information about the access technology, the CS 322 may save the PANI information.

The CS 322 acknowledges receipt of the location updating request message by transmitting a 200 OK SIP response to the femtocell system 350 (step 612). Network authentication and registration then occurs via exchanges between the CS 322 and HLR/AC (step 614). As part of the authentication response, the HLR/AC may trigger Unique Challenge, SSD update, or CountUpdate procedures.

The CS 322 informs the femtocell system 350 of the authentication and registration results by transmitting a SIP location updating response message to the femtocell system 350 (step 616). In the event of an authentication or registration failure, the CS 322 may send a SIP:MESSAGE containing, for example, an XML-encoded message body that facilitates deregistration of the femtocell system 350. The femtocell system 350 acknowledges receipt of the authentication and registration results by sending a 200 OK SIP response to the CS 322 (step 618). In the event of either a registration or authentication failure, a deregistration process 630 is invoked by the femtocell system 350 transmitting a deregistration message, e.g., a SIP: REGISTER message with an expire value "0", to the CS 322 (step 620). The CS 322 acknowledges receipt of the deregistration message by transmitting a 200 OK SIP response to the femtocell system 350 (step 622).

Figure 7:
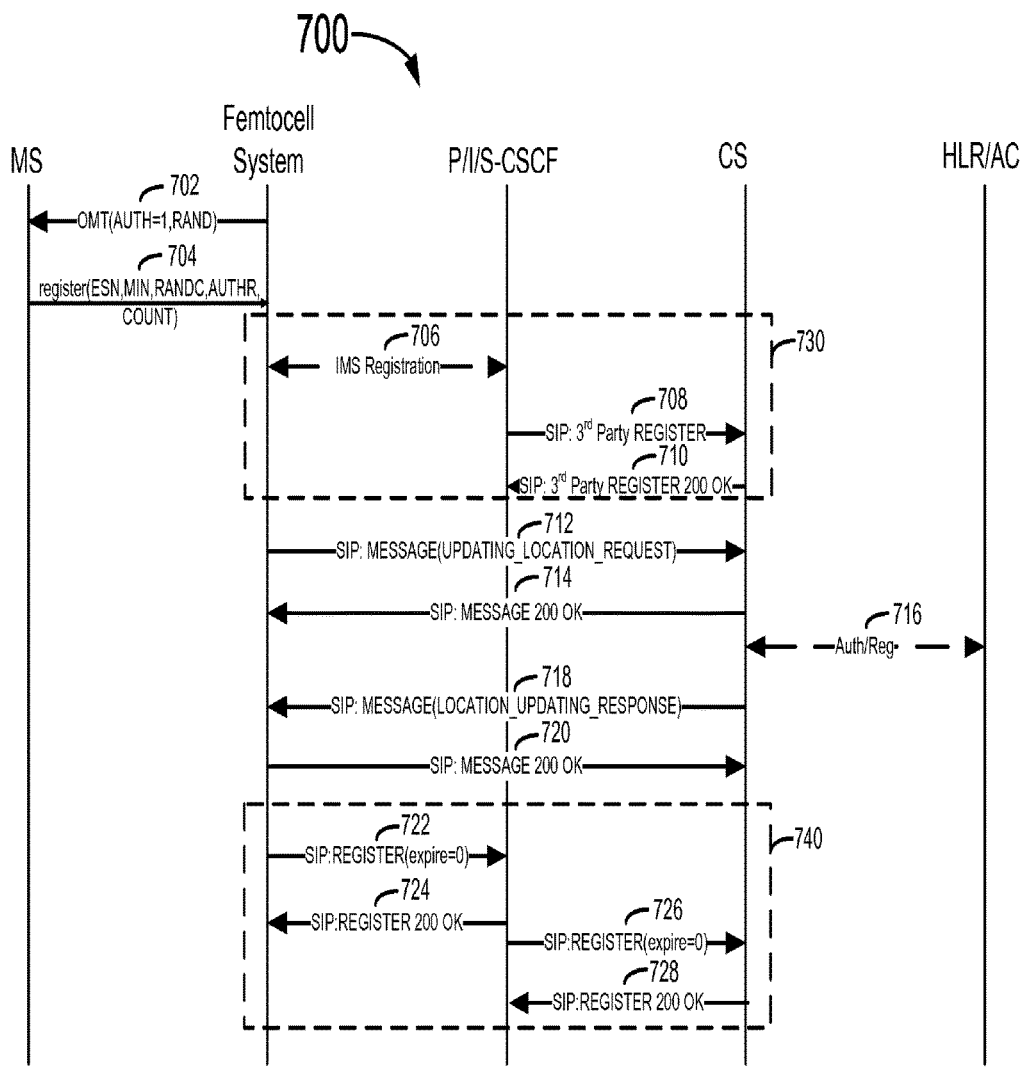
FIG. 7 depicts a diagrammatic representation of a registration and authentication process on initial system access by a mobile station via a femtocell system in an Internet Protocol Multimedia Subsystem network implemented in accordance with an embodiment.

FIG. 7 depicts a diagrammatic representation of a registration and authentication process 700 on initial system access by an MS via a femtocell system in an IMS network, such as network system 301 depicted in FIG. 3B, implemented in accordance with an embodiment. In this implementation, it is assumed that the MS comprises a standard 1x mobile phone and the femtocell system 350 is configured to operate as an IMS client on behalf of the mobile stations attached with the femtocell system 350. When an MS attempts to establish a connection with the femtocell system 350, the femtocell system 350 first attempts to register in the IMS network on behalf of the MS. As part of the registration, the IMS network may perform IMS-AKA authentication or, alternatively, allow the registration without performing any authentication. Further, in the described implementation, it is assumed that the CS 322 is configured to act as an application server (AS) in the IMS domain, and that it receives 3rd-party registration requests from the S-CSCF at the end of the IMS network registration process.

The femtocell system 350 transmits an OMT (step 702) at a predefined interval. An MS 325 in idle mode may detect the OMT when the MS 325 is within range of the femtocell system 350 as described above with reference to FIG. 3A. The OMT transmitted by the femtocell system 350 may include an authentication bit (AUTH) having a value, e.g., "1", that indicates authentication is required for all system access, and a random number (RAND) generated by the femtocell system 350. On receipt of the OMT, the MS determines that a new serving system has been encountered and that authentication is required based on the authentication bit value (AUTH=1). Subsequently, the MS 325 attempts to obtain the random number (RAND) to be used for the authentication from the OMT. If the random number is not available, a zero value may be used by the MS as prescribed by TR-45 authentication procedures. The MS 325 then generates an authentication result (AUTHR), and transmits a registration request to the femtocell system 350 (step 704). The registration message may include the MS's MIN, ESN or p-ESN, the authentication result (AUTHR), a CallHistoryCount (COUNT), and a random number confirmation (RANDC) derived from the random number (RAND) used to compute the authentication result (AUTHR).

An IMS registration phase 730 is then initiated by the femtocell system 350 sending a registration request to the S-CSCF (step 706). The S-CSCF then sends a 3rd-party registration request to the CS 322 (step 708), and the CS 322 returns a 200 OK SIP response to the S-CSCF (step 710) for the 3rd-party registration which completes the IMS network registration.

If the registration fails, the CS 322 informs the femtocell system 350 to perform IMS network deregistration. Assuming the registration is successful, an authentication process is then invoked by the femtocell system 350 transmitting 1x authentication parameters received from the MS 325 at step 704 to CS 322 in a SIP: MESSAGE(LOCATION_UPDATING_REQUEST) (step 712). The location updating request message includes the random number (RAND) rather than the random number confirmation (RANDC). The location updating request message additionally may include parameters, such as a Register ID, ESN, MEID, MIN, IMSI, etc. If the location updating request message includes a P-Access-Network-Info (PANI) header that may specify information about the access technology, the CS 322 saves the PANI information.

The CS 322 acknowledges receipt of the location updating request message by transmitting a 200 OK SIP response to the femtocell system 350 (step 714). Network authentication and registration then occurs via exchanges between the CS 322 and HLR/AC (step 716). As part of the authentication response, the HLR/AC may trigger Unique Challenge, SSD update, or CountUpdate procedures.

The CS 322 informs the femtocell system 350 of the authentication and registration results by transmitting a SIP location updating response message to the femtocell system 350 (step 718). In the event of an authentication or registration failure, the CS 322 may send a SIP:MESSAGE containing, for example, an XML-encoded message body that facilitates deregistration of the femtocell system 350. The femtocell system 350 acknowledges receipt of the authentication and registration results by sending a 200 OK SIP response to the CS 322 (step 720).

In the event of either a registration or authentication failure, a deregistration process 740 is invoked by the femtocell system 350 transmitting a deregistration message, e.g., a SIP: REGISTER message with a expire value "0", to the S-CSCF (step 722). The S-CSCF acknowledges receipt of the deregistration message by transmitting a 200 OK SIP response to the femtocell system 350 (step 724). The S-CSCF then transmits the deregistration message to the CS 322 (step 726) which acknowledges receipt of the deregistration message by transmitting a 200 OK SIP response to the S-CSCF (step 728) thereby completing deregistration of the MS.

The CS 322 may receive a SIP:REGISTER message for a subscriber who is not currently SIP registered, but for whom the CS 322 maintains subscription data from the HLR. For example, the CS 322 may maintain the HLR subscription information for a configurable period after a SIP deregistration. In this scenario, a MS re-registration procedure may be invoked. The re-registration may be consistent with that as described above with reference to FIG. 6 except the CS 322 is not required to request the user profile from the HLR.

Periodic registration is optionally required in mobile networks. If periodic registration is enabled, the HLR may return an "Authorization Period" in response to a Registration Notification (REGNOT). In this case, the CS 322 may send a SIP:MESSAGE (ORDERED_REGISTRATION_REQUEST) before the "Authorization Period" expires. On receiving this request, the femtocell system 350 may send the ordered registration request to the MS 325 to send registration-related parameters.

Regardless of an "Authorization Period" timer, the SIP registration period dictates the interval at which the SIP registration from the femtocell system 350 needs to be refreshed. In such a case, the femtocell system 350 needs to refresh the registration prior to the expiration period while the MS 325 is attached to the femtocell system 350. Such registration procedures are preferably processed locally at the CS 322. The femtocell system 350 sends a SIP:REGISTER message to the CS 322, and the CS 322 returns a SIP 200 OK response to the femtocell system 350.

When deregistration occurs, e.g., either due to registration timeout or mobile-initiated/network deregistration, the CS 322 may typically not delete HLR subscriber data which is eligible to be aged out, or removed by a REGCANC message. The CS 322 may send a mobile station inactive (MSINACT) message to the HLR with the optional DeregistrationType parameter omitted which indicates that subscriber data is still being maintained by the CS 322. Such a situation may occur, for example, due to the MS 325 being powered off and it is desirable to have the subscription data available when the MS is powered back on. However, the time the MS was last registered is maintained with the subscription data.

If the MS does not re-register for a configurable time (e.g., 24 hours), the subscriber data may be deleted and an MSINACT message is sent to the HLR with the DeregistrationType set to "administrative reason" indicating that the subscriber data has been purged from the CS 322. This may also occur as needed to free up space in the database thereby deleting the oldest data first based on when it was last accessed.

A mobile initiated de-registration process may be invoked when the CS 322 receives a SIP:REGISTER from the femtocell system 350 with a timeout of zero for a current registration. In an IMS network, the CS 322 may receive this message from the S-CSCF as a 3rd-party SIP:REGISTER message. For example, such a de-registration may occur when the femtocell system 350 receives a power-down indication from the MS, the femtocell system 350 detects MS inactivity, or the femtocell system 350 detects a loss of radio contact.

Deregistration may additionally occur due to location updating. When the MS registers in a macrocell, the HLR preferably notifies the CS 322 accordingly. If the SIP registration for the corresponding MS is currently active, the CS 322 may send a SIP:MESSAGE (Deregister) to the femtocell system 350 requesting it to deregister. Registration cancellation may additionally occur due to administrative reasons as well. In such a case, the MS may be in a call or using some network service. If the cancellation indicates that service is to be discontinued immediately, the CS 322 terminates any call in progress.

In accordance with disclosed embodiments, mechanisms that facilitate indirect routing of mobile-originated short messages service (SMS) messages for a mobile station attached with a femtocell system are provided. As is understood, SMS supports the transmission and reception of simple messages. SMS may support various types of services. For example, an SMS bearer service may comprise a basic transport mechanism to convey an SMS message (with a length up to 200 octets) as a packet of data between two points or short message entities (SMEs) on the network. SMS teleservices may provide flexible custom applications for communication between SMS users (i.e., SMEs). These services require two functional entities in addition to those used for basic mobile telecommunications. The message center (MC), e.g., MC 312, provides a store-and-forward function for most mobile originated short messages and for all mobile-terminated short messages. MS-based SMEs are associated with an MC, known as the home MC, in the MS's home system. In the described embodiments, it is assumed that the mobile core network 310 comprises the MS's 325 home carrier network, and thus the MC 312 comprises the MS's 325 home MC. A short-message entity, e.g., a mobile station, a personal digital assistant (PDA), or any other suitable data processing system adapted to communicatively interface with the femtocell system 350 and the mobile core network 310 depicted in FIG. 3 and further adapted to process SMS messages, comprises a functional entity capable of composing and decomposing a short message.

The home MC may be bypassed for a mobile-originated short message, and the SMS may be sent directly to a destination SME by the serving MSC (i.e., by direct routing procedures). In this case, no originating supplementary services may be applied to the message. In this instance, the CS, operating as the VLR/MSC (i.e., the location register and switching center of the serving system), will use only indirect routing in accordance with an embodiment. That is, for mobile-originated short messages, the serving system, (i.e., the CS), will forward the short message to the home MC. From there, the short message is sent to the destination MC.

In accordance with an embodiment, mobile-originated short messages may be delivered via indirect routing. Depending on the existence of an assigned traffic channel (e.g., an active voice call) for the MS and/or the size of the SMS being sent, the MS may elect to use the traffic or paging channel for delivery of a short message. In both scenarios it is assumed that the MS is registered with the CS 322. If the MS selects the traffic channel for delivery of the SMS message and if there is no existing traffic channel, the MS may first attempt to establish a traffic channel using the same procedure used while attempting to initiate a voice call as described below with regard to block 850 of FIG. 8. If an active traffic channel is already established between the MS and the femtocell system 350, then the steps of block 850 are not executed. Once the traffic channel is established, the MS sends the SMS message to the femtocell system which, in turn, forwards the SMS message to the CS 322 using a SIP:MESSAGE.

If the MS elects to send the SMS message over a paging channel, it sends the SMS message along with the 1x authentication data to the femtocell system 350. Similar to the traffic channel SMS delivery scenario, the femtocell first performs the authentication during steps 824-832 of FIG. 8 as described more fully hereinbelow. Once the authentication result is received from the CS 322, the femtocell system then forwards the SMS message to the CS 322 using a SIP:MESSAGE.

Figure 8:
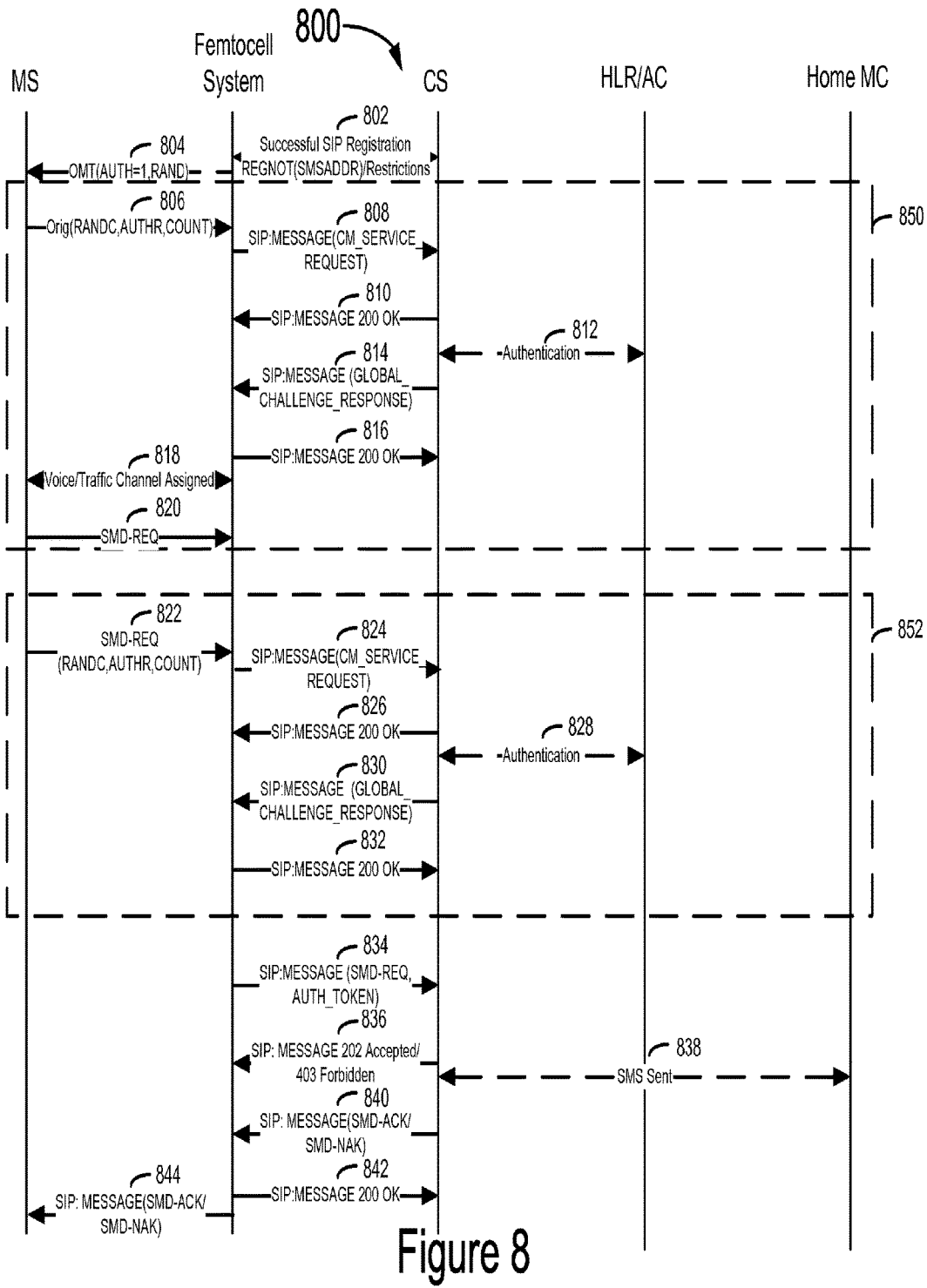
FIG. 8 depicts a diagrammatic representation of a signaling flow of a mobile-originated short message service delivery procedure utilizing indirect routing in accordance with an embodiment.

FIG. 8 depicts a diagrammatic representation of a signaling flow 800 of a mobile-originated SMS delivery procedure utilizing indirect routing in accordance with an embodiment. The MS is successfully registered in the network system (step 802), e.g., via a SIP registration process. The MS then determines that authentication is required on all system accesses, e.g., on receipt of an Overhead Message Train (OMT) that includes an authentication value (e.g., AUTH=1) that indicates authentication is required (step 804). The random number (RAND) to be used for authentication may also be obtained by the MS from the OMT. If it is not, a zero value may be used by the MS as prescribed by TR-45 authentication. The MS executes an instance of the CAVE algorithm using the dialed digits of the device to which the SMS message is to be delivered, the RAND, the ESN/p-ESN, and the SSD currently stored to produce an origination Authentication Result (AUTHR).

In the event the MS elects to send the SMS message via a traffic channel (block 850), the MS then sends an SMS origination message to the femtocell system providing the dialed digits, its MIN, ESN/p-ESN, the Authentication Result (AUTHR), the CallHistoryCount (COUNT), and the RANDC calculated from the RAND used to compute the Authentication Result (AUTHR) (step 806). The femtocell system, on receipt of the SMS origination attempt from the MS, may verify the RANDC value supplied by the MS and send a service request message required for authentication using a SIP: MESSAGE(CM SERVICE REQUEST) to the CS (step 808) that includes the called and calling party numbers. The service request message may include the RANDC, authentication result (AUTHR), and COUNT values supplied by the MS. The CS 322 may acknowledge receipt of the service request by returning a SIP 200 OK response (step 810). The CS then engages the mobile core network 310, e.g., the HLR 314/AC 315, in an authentication process to authenticate the MS (step 812).

The CS then forwards the result of the authentication to the femtocell system using a SIP message including a global challenge response (GLOBAL CHALLENGE RESPONSE) along with the encryption information received from the HLR/AC and a locally generated authentication token (step 814). The femtocell system presents the authentication token received in the global challenge response to the CS in a subsequent SIP:MESSAGE(SMD-REQ). The CS may deny the SMS request if this token is not received. If an active traffic channel is available due to an active voice call just before sending the SMS message, the femtocell system 350 has to include the authentication token provided while establishing the call. The femtocell system acknowledges the receipt of the global challenge response message (step 816). Once the traffic channel is established between the MS and the femtocell system 350 (step 818), the MS sends the SMS message (SMD-REQ) to the femtocell system 350 (step 820).

In the event the SMS message is to be delivered on the paging channel (block 852), the MS sends the SMS message (SMD-REQ) to the femtocell system along with the 1x authentication information (step 822). The femtocell system maintains the SMS message locally while performing the 1x authentication procedures. To this end, the femtocell system, on receipt of the SMS origination attempt from the MS, may verify the RANDC value supplied by the MS and send a service request message required for authentication using a SIP: MESSAGE CM_SERVICE_REQUEST) to the CS (step 824) that includes the called and calling party numbers. The service request message may include the RANDC, authentication result (AUTHR), and COUNT values supplied by the MS. The CS 322 may acknowledge receipt of the service request by returning a SIP 200 OK response (step 826). The CS then engages the mobile core network 310, e.g., the HLR 314/AC 315, in an authentication process to authenticate the MS (step 828). The CS 322 forwards the result of the authentication to the femtocell system using a SIP message including a global challenge response (GLOBAL CHALLENGE RESPONSE) along with the encryption information received from the HLR/AC and a locally generated authentication token (step 830). The femtocell system presents the authentication token received in the global challenge response to the CS in a subsequent SIP:MESSAGE(SMD-REQ). The CS may deny the SMS request if this token is not received. The femtocell system acknowledges the receipt of the global challenge response message (step 832).

The SMS message is then delivered to the CS 322 (step 834). To this end, the femtocell system formats a SIP: MESSAGE with the content-type header set to multipart/mixed and with binary SMD-REQ data in one message body (e.g., content-type=application/vnd.3gpp2.sms) and the authentication token (AUTH_TOKEN) in a separate message body (e.g., content-type=application/vnd.3gpp2.bsap+xml). If the validation of the authentication token is successful, the CS 322 responds with a SIP "202 Accepted" message, otherwise it returns a SIP "403 forbidden" message to the femtocell system 350 (step 836).

The SMS message is then delivered to the MC 312 if the validation of the authentication token is successful (step 838). The CS 322 creates a SIP: MESSAGE with the SMD-ACK for positive acknowledgement of the SMS transmission or, alternatively, SMD-NAK for negative acknowledgement of the short message delivery and sends it to the femtocell system 350 (step 840). The femtocell system acknowledges receipt of the SMD-ACK or SMD-NAK by returning a SIP 200 OK response to the CS 322 (step 842) and forwards the SMD-ACK or SMD-NAK to the mobile station (step 844).

FIG. 9A is a diagrammatic representation of a service request message 900 transmitted to the CS from the femtocell system implemented in accordance with an embodiment. The service request message 900 transmitted to the CS, e.g., according to step 808 or 824 of FIG. 8, may be generated by the femtocell system in response to receipt of the origination request received from the MS according to step 806 of FIG. 8 or receipt of the SMS origination request received from the MS according to step 822 of FIG. 8. The service request message 900 may be implemented as a SIP message including the depicted XML-encoded service request message.

The service request message 900 is transmitted from the femtocell system 350 to the CS 322 to authenticate an MS for a mobile-originated short message. In an embodiment, the service request message 900 may include a message body 920 that includes a service request message ID field 902 in which the femtocell system 350 provides a message identifier, e.g., a 32 bit message identifier, to facilitate correlation between the request and response(s). When a global challenge results in a unique challenge, SSD update, and/or count update, the CS 322 may include the same message ID in those transactions. The femtocell system 350 may initiate a maximum timer for response to the service request that is initiated after receiving the 200 OK response from the CS for the service request, e.g., according to step 810 or 826 of FIG. 8. The timer is stopped when the global challenge response is received by the femtocell system, e.g., according to step 814 or 830 of FIG. 8. If the service request results in an SSD Update, Unique Challenge, and/or count update, the timeout may be increased accordingly. The service request message 900 may additionally include a random number field 904 that includes the random number (RAND) provided to the MS, e.g., according to step 804, used for authentication, an authentication response field 906 that includes the authentication response (AUTHR) generated by the MS, and a count field 908. Further, the service request message body 920 may include the calling party number digits 910. Alternatively, a service request message body 922 may include authentication data 912 in lieu of the calling party number digits.

FIG. 9B is a diagrammatic representation of a global challenge response message 940 transmitted to the femtocell system 350 from the CS 322 in accordance with an embodiment. The global challenge response message 940 transmitted to the femtocell system, e.g., according to step 814 or step 830 of FIG. 8, may be generated by the CS in response to the authentication procedure performed between the CS and the HLR/AC according to step 812 or 828 of FIG. 8. The global challenge response message 940 may be implemented as a SIP message including the depicted XML-encoded global challenge response message.

The global challenge response message 940 is transmitted from the CS 322 to the femtocell system 350 in response to a service request and paging authentication request to convey the global challenge authentication result, authentication token, and the encryption information (CDMAPrivateLongCodeMask (CDMAPLCM), SignalingMessage EncryptionKey (SMEKEY), and VoicePrivacyMask (VPMASK) received from the AC. To this end, the global challenge response message 940 may include a global challenge response message ID field 942, a successful authentication field 944 that includes an identifier, e.g., a Boolean value, that specifies whether the authentication was successful, and an authentication token field 946 that includes the authentication token. Further, the global challenge response message 940 may include a CDMAPLCM field 948 that includes the CDMA private long code mask, a SMEKEY field 950 that includes the signaling message encryption key, and a VPMASK field 952 that includes the voice privacy mask in the event of a successful authentication.

As described, mechanisms that facilitate indirect routing of mobile-originated short messages for a mobile station attached with a femtocell system are provided. A convergence server operating as the Visitor Location Register/Mobile Switching Center uses indirect routing for message delivery, e.g., by forwarding a mobile-originated short message to the home message center of the mobile station. Thereafter, the short message is sent to the destination message center. Depending on the existence of an assigned traffic channel for the MS and/or the size of the SMS being sent, the MS may elect to use a traffic or paging channel for delivery of a short message. If the MS selects the traffic channel for delivery of the SMS message and if there is no existing traffic channel, the MS may first attempt to establish a traffic channel. If an active traffic channel is already established between the MS and the femtocell system, the MS sends the SMS message to the femtocell system which, in turn, forwards the SMS message to the CS. If the MS elects to send the SMS message over a paging channel, the MS sends the SMS message along with 1x authentication data to the femtocell system. The femtocell system first performs the authentication, and subsequently forwards the SMS message to the CS which, in turn, forwards the short message to the home message center of the MS that originated the SMS message.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
receiving, by a convergence server deployed in a core network, a service request message for a mobile station communicably coupled with a femtocell system, the service request message having originated from the femtocell system after the femtocell system receives a message from the mobile station, identifying a destination mobile device to which the message will be sent;
authenticating, by the core network, the mobile station;
responsive to the authentication process, transmitting, by the convergence server, a global challenge response to the femtocell system, the global challenge response message including an authentication token generated by the convergence server;
receiving, by the convergence server, a short message originated by the mobile station from the femtocell system, the short message identifying the device;
determining, by the convergence server, whether the authentication token has been presented to the convergence server by the femtocell system and denying the service request message if the authentication token has not been presented to the convergence server by the femtocell system; and
if the authentication token has been presented to the convergence server by the femtocell system, transmitting, by the convergence server, the short message to a home message center of the mobile station which thereafter transmits the short message from the home message center of the mobile station to a destination mobile center of the destination mobile device.

2. The method of claim 1, wherein the short message is transmitted to the femtocell system from the mobile station via a traffic channel and the service request message is generated by the femtocell system responsive to receipt of an origination request from the mobile station, the method further comprising establishing a traffic channel between the mobile station and the femtocell system.

3. The method of claim 2, wherein the short message is received by the convergence server responsive to establishment of the traffic channel.

4. The method of claim 1, wherein the service request message is generated by the femtocell system responsive to receipt of a short message service request including the short message from the mobile station.

5. The method of claim 1, wherein the short message service request is received by the femtocell system on a paging channel.

6. The method of claim 1, wherein the short message is received by the convergence server with the authentication token.

7. The method of claim 6, further comprising validating, by the convergence server, the authentication token received with the short message.

8. The method of claim 7, wherein the convergence server transmits the short message to the message center responsive to validating the authentication token received with the short message.

9. A non-transitory computer-readable medium having computer-executable instructions tangibly embodied thereon for execution by a processing system that, when executed, cause the processing system to:
receive, by a convergence server deployed in a core network, a service request message for a mobile station communicably coupled with a femtocell system, the service request message having originated from the femtocell system after the femtocell system receives a message from the mobile station, identifying a destination mobile device to which the message will be sent;
authenticate, by the core network, the mobile station;
transmit, by the convergence server, a global challenge response message including an authentication token to the femtocell system;
responsive to the authentication process, transmit, by the convergence server, a global challenge response to the femtocell system, the global challenge response message including an authentication token generated by the convergence server;
receive, by the convergence server, a short message originated by the mobile station from the femtocell system, the short message identifying the device;
determine, by the convergence server, whether the authentication token has been presented to the convergence server by the femtocell system and denying the service request message if the authentication token has not been presented to the convergence server by the femtocell system; and
if the authentication token has been presented to the convergence server by the femtocell system, transmit, by the convergence server, the short message to a home message center of the mobile station which thereafter transmits the short message from the home message center of the mobile station to a destination mobile center of the destination mobile device.

10. The non-transitory computer-readable medium of claim 9, wherein the short message is transmitted to the femtocell system from the mobile station via a traffic channel and the service request message is generated by the femtocell system responsive to receipt of an origination request from the mobile station, the computer-readable medium further comprising instructions that, when executed by the processing system, cause the processing system to establish a traffic channel between the mobile station and the femtocell system.

11. The non-transitory computer-readable medium of claim 10, wherein the short message is received by the convergence server responsive to establishment of the traffic channel.

12. The non-transitory computer-readable medium of claim 9, wherein the service request message is generated by the femtocell system responsive to receipt of a short message service request including the short message from the mobile station and wherein the short message service request is received by the femtocell system on a paging channel.

13. The non-transitory computer-readable medium of claim 9, wherein the short message is received by the convergence server with the authentication token.

14. The non-transitory computer-readable medium of claim 13, further comprising instructions that, when executed by the processing system, cause the processing system to validate, by the convergence server, the authentication token received with the short message.

15. The non-transitory computer-readable medium of claim 14, wherein the convergence server transmits the short message to the message center responsive to validating the authentication token received with the short message.

16. A system, comprising:
a core network that includes a convergence server;
a mobile core network that includes an authentication center, a Home Location Register, and a home message center of the mobile station; and
an Internet Protocol-based femtocell system that provides a radio access point for a mobile station, wherein the convergence server receives a service request message for the mobile station, the service request message having originated from the femtocell system after the femtocell system receives a message from the mobile station identifying a destination mobile device to which the message will be sent, authenticates the mobile station in response to receiving the service request, transmits a global challenge response message including an authentication token to the femtocell system, responsive to the authentication process, transmits a global challenge response to the femtocell system, the global challenge response message including an authentication token generated by the convergence server, receives a short message originated by the mobile station from the femtocell system, the short message identifying the device, determines whether the authentication token has been presented to the convergence server by the femtocell system and denies the service request message if the authentication token has not been presented to the convergence server by the femtocell system, and if the authentication token has been presented to the convergence server by the femtocell system, transmits the short message to the home message center which thereafter transmits the short message from the home message center of the mobile station to a destination mobile center of the destination mobile device.

17. The system of claim 16, wherein the short message is transmitted to the femtocell system from the mobile station via a traffic channel and the service request message is generated by the femtocell system responsive to receipt of an origination request from the mobile station, and wherein a traffic channel is established between the mobile station and the femtocell system and the short message is received by the convergence server responsive to establishment of the traffic channel.

18. The system of claim 16, wherein the service request message is generated by the femtocell system responsive to receipt of a short message service request including the short message from the mobile station, and wherein the short message service request is received by the femtocell system on a paging channel.

19. The system of claim 16, wherein the short message is received by the convergence server with the authentication token, and wherein the convergence server validates the authentication token received with the short message.

20. The system of claim 19, wherein the convergence server transmits the short message to the message center responsive to validating the authentication token received with the short message.

* * * * *